(12) United States Patent
Wöstmann et al.

(10) Patent No.: US 12,115,577 B2
(45) Date of Patent: Oct. 15, 2024

(54) METHOD OF FORMING A HELIX, PERMANENT MOLD FOR FORMING A HELIX, AND HELIX

(71) Applicant: Fraunhofer-Gesellschaft zur Förderung der angewandten Forschung e.V., Munich (DE)

(72) Inventors: Franz-Josef Wöstmann, Bremen (DE); Michael Heuser, Bremen (DE); Matthias Busse, Bremen (DE)

(73) Assignee: Fraunhofer-Gesellschaft zur Förderung der angewandten Forschung e. V., Munich (DE)

( * ) Notice: Subject to any disclaimer, the term of this patent is extended or adjusted under 35 U.S.C. 154(b) by 533 days.

(21) Appl. No.: 17/277,908

(22) PCT Filed: Sep. 19, 2019

(86) PCT No.: PCT/EP2019/075160
§ 371 (c)(1),
(2) Date: Mar. 19, 2021

(87) PCT Pub. No.: WO2020/058397
PCT Pub. Date: Mar. 26, 2020

(65) Prior Publication Data
US 2021/0346948 A1    Nov. 11, 2021

(30) Foreign Application Priority Data
Sep. 19, 2018  (DE) .................... 10 2018 215 986.6

(51) Int. Cl.
*B22D 25/02*     (2006.01)
*B22C 9/22*      (2006.01)
*B22D 31/00*     (2006.01)

(52) U.S. Cl.
CPC ............... *B22D 25/02* (2013.01); *B22C 9/22* (2013.01); *B22D 31/002* (2013.01)

(58) Field of Classification Search
CPC ...... B22D 25/02; B22D 31/00; B22D 31/002; B22C 9/22
(Continued)

(56) References Cited

U.S. PATENT DOCUMENTS

| | | |
|---|---|---|
| 2012/0267979 A1 | 10/2012 | Yoshida et al. |
| 2020/0212770 A1 | 7/2020 | Yoshikawa et al. |
| 2022/0040751 A1 | 2/2022 | Wostmann et al. |

FOREIGN PATENT DOCUMENTS

| | | |
|---|---|---|
| CN | 102751797 A | 10/2012 |
| DE | 102010020897 A1 | 11/2011 |

(Continued)

OTHER PUBLICATIONS

Machine translation of EP 3 208 013 A1 (Year: 2017).*
(Continued)

*Primary Examiner* — Kevin P Kerns
(74) *Attorney, Agent, or Firm* — Faegre Drinker Biddle & Reath LLP

(57) ABSTRACT

A method for producing a helix includes a step of providing a permanent mold with mold halves which are joined together on a mold parting line. The method additionally has a step of joining together the mold halves of the permanent mold such that the permanent mold has a cavity, which defines the shape of the helix or the shape of a bent-up helix, when the permanent mold is joined together, wherein the helix or the bent-up helix has a flattened profiled winding cross-section which has two opposite flat sides, an outer side and an inner side opposite the outer side, and the mold (Continued)

parting line runs at least partly along the outer side and/or the inner side and/or edges of the profiled winding cross-section.

11 Claims, 10 Drawing Sheets

(58) Field of Classification Search
USPC .................................................. 164/47, 69.1
See application file for complete search history.

(56) References Cited

FOREIGN PATENT DOCUMENTS

| | | |
|---|---|---|
| DE | 102013000899 A1 | 8/2014 |
| DE | 102013012659 A1 | 2/2015 |
| DE | 102014106851 A1 | 11/2015 |
| DE | 102015212224 A1 | 1/2017 |
| DE | 102016202657 A1 | 8/2017 |
| EP | 2387135 A2 * | 11/2011 ............. H02K 15/04 |
| EP | 3 208 013 A1 * | 8/2017 ............... B22C 9/00 |
| JP | 62-028045 A | 2/1987 |
| JP | 2003-347117 A | 12/2003 |
| JP | 2004-336969 A | 11/2004 |
| JP | 2015-002614 A | 1/2015 |
| JP | 2015-009259 A | 1/2015 |
| JP | 2022-500250 A | 1/2022 |
| WO | 2018/135086 A1 | 7/2018 |

OTHER PUBLICATIONS

International Search Report and Written Opinion received for PCT Patent Application No. PCT/EP2019/075160, mailed on Nov. 21, 2019, 17 pages. (7 pages of English Translation and 10 pages of Original Document).

* cited by examiner

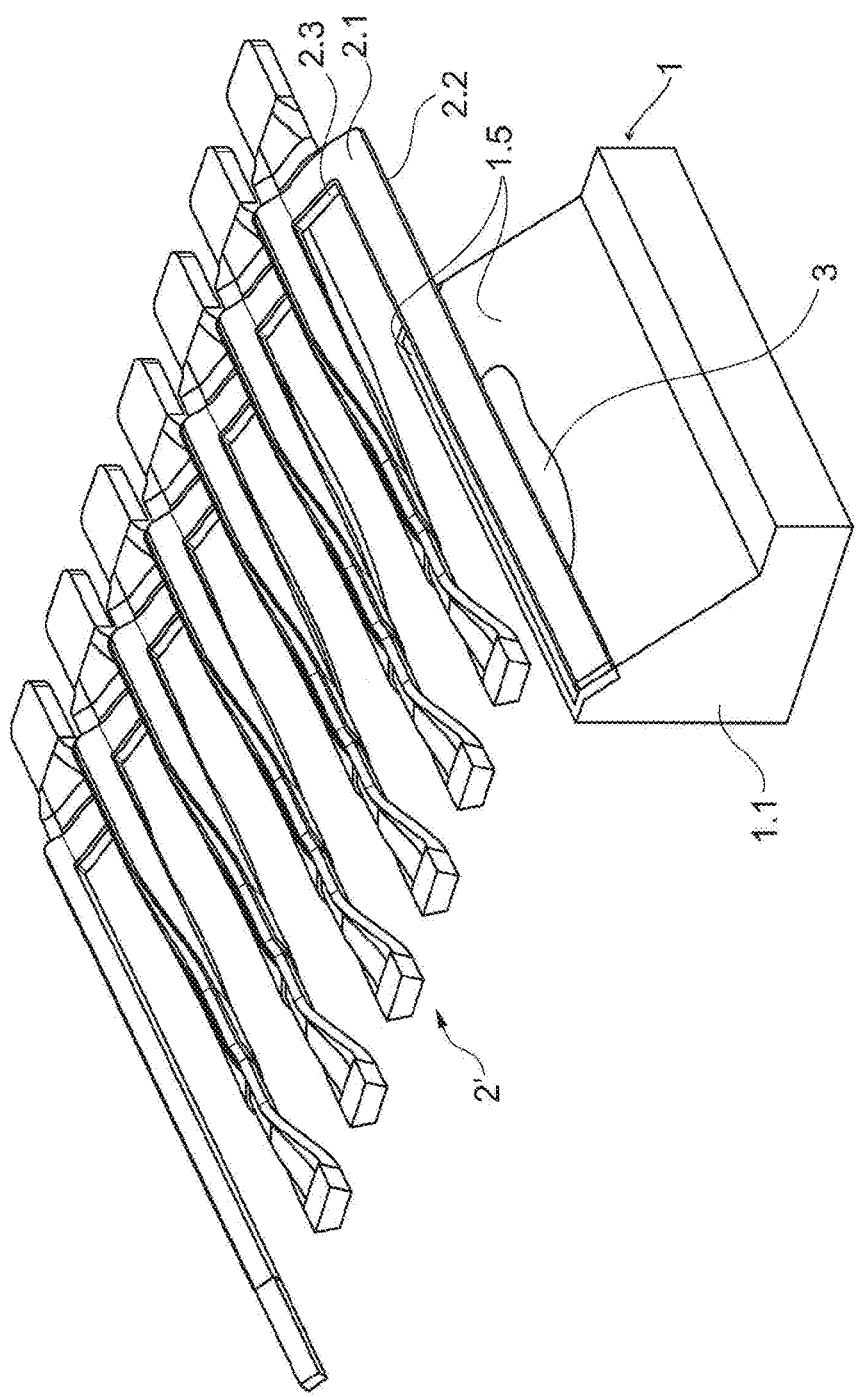

METHOD OF FORMING A HELIX, PERMANENT MOLD FOR FORMING A HELIX, AND HELIX

CROSS REFERENCE TO RELATED APPLICATIONS

The present application is a national stage application of International Application No. PCT/EP2019/075160, filed Sep. 19, 2019, which claims priority to German Application No. DE102018215986.6, filed Sep. 19, 2018, the disclosures of which are hereby incorporated by reference in their entireties.

FIELD OF THE DISCLOSURE

The present invention relates to a method for producing a helix. It further relates to a permanent mold used to produce a helix, and to a helix produced by means of the method or by means of the permanent mold.

BACKGROUND OF THE DISCLOSURE

Helices used as electric coils, for example, are often wound according to the prior art. In this process, winding is sometimes carried out manually in order to improve the filling level compared to series processes. A significant improvement in performance has recently been achieved with cast coils.

DE Patent Application Publication No. 10 2012 212 637 A1 describes the casting production of coils. This type of production allows the filling factors, which are unfavorable for windable round wires, to be significantly exceeded by using other wire geometries (which would not normally be windable), thus increasing performance.

For coils produced by casting technology, for complex geometries, the prior art involves inserting cores or using slides in addition to a mold, which may make production expensive or inefficient.

Furthermore, the mold is subjected to high stresses due to high casting temperatures, which may lead to washouts and cracks in the mold. This damage leads to the formation of raised burrs on the coil surface. The burrs may negatively affect the quality of the manufactured coils and require extensive finishing. As a result, the production processes are complex and the service lives for the molds used are very short, so that the production of cast coils has often not been very economical to date.

SUMMARY

It is the object of the present invention to at least partially overcome the above problems.

This is achieved by a method having features according to the claims and by a permanent mold and helix having the features according to the claims.

Advantageous embodiments will also become apparent from the claims as well as from the description and the figures.

The method is used to produce a helix in a casting process.

Here, the method comprises at least one step of providing a permanent mold which has mold halves that may be joined together in a mold parting plane.

The mold halves of the permanent mold are joined together so that the permanent mold, when joined, has a cavity that defines a form of the helix or a form of a bent-up helix.

In this case, the helix or the bent-up helix, which is defined by the cavity, has a flattened winding cross-section profile with two opposite flat sides, an outer side and an inner side opposite the outer side.

The mold parting plane runs here at least in sections along the outer side and/or along the inner side and/or along edges of the winding cross-section profile.

In a further step of the method, a casting material is introduced into the cavity to produce a casting having the form of the helix defined by the cavity or the form of the bent-up helix defined by the cavity.

In a subsequent step, the permanent mold is opened and the casting is removed.

Burrs running along the outer side and/or inner side and/or edges of the casting are then removed. These aforementioned burrs extend in the mold parting plane.

The flat sides face each other when the casting is in the form of the helix or is brought into the form of the helix. The inner sides delimit an inner cavity of the helix into which, for example, a coil core may be inserted. The outer side facing away from the inner side is typically freely accessible when the casting is in the form of the helix or is brought into the form of the helix.

An advantage of the method is that the outer side and the inner side and the edges where the mold parting plane runs at least in sections are easily accessible when the casting is in the form of the helix or is brought into the form of the helix. Burrs occur in the mold parting line when the casting material gets between the mold halves along the mold parting line. Accordingly, the burrs run at least in sections along the easily accessible areas mentioned and may be removed with little effort.

In one embodiment of the method, the mold parting line runs predominantly along the outer side and/or the inner side and/or the edges. A length of a cutting line may be defined, in which the mold parting line runs along the molded part lying in the cavity. Burrs may appear along this cutting line. For example, this cutting line runs along the outer side and/or the inner side and/or the edges for at least 60 percent of its length, preferably for at least 75 percent of its length, particularly preferably for at least 90 percent of its length.

In one embodiment of the method, the permanent mold comprises exactly two mold halves. Preferably, no additional slides or cores are used.

Embodiments of the method are envisaged in which the cavity does not dictate the form of the finished bent helix, but rather the form of the bent-up helix. In such embodiments, the casting may be bent into the form of the helix after removal. This is done, for example, by pressing together, orthogonally to the flat sides. Compression may also be accomplished by inserting a mandrel into the cavity of the helix, wherein the mandrel may have a flat part at one end that is pressed against the flat side of the helix. As an alternative or in addition to bending into the form of the helix, burrs projecting into the cavity may be bent over by inserting the mandrel.

In the sections in which it runs along the outer side and/or the inner side and/or the edges of the winding cross-section profile, the mold parting line may be designed to enclose an angle of more than 0 degrees and less than 180 degrees with the outer side and/or the inner side, so that burrs formed extend further inwards starting from the inner side or further outwards starting from the outer side. In other words, the mold parting line and burrs caused by it, in particular, are not parallel to the outer side and the inner side. This makes the resulting burrs particularly easy to remove.

Alternatively or additionally, the cavity may have additional indentations in at least part of the areas where the mold parting line runs along the outer side and/or the inner side and/or the edges of the winding cross-section profile. The additional indentations in the cavity produce corresponding additional material on the casting. The additional material is not required for the envisioned coil and represents sacrificial structures extending along the outer side and/or inner side and/or edges of the helical casting in the mold parting line. The sacrificial structures are removed in a finishing step after the casting has been removed, together with the burrs that run along them.

The burrs and/or the sacrificial structures may be removed, for example, by the mandrel described above and/or by milling processes and/or by grinding processes.

The casting material may comprise, for example, aluminum and/or copper. For example, a casting temperature may be above 1100 degrees Celsius. Examples of casting methods include die casting or permanent mold casting or low-pressure die casting.

Due to the complex geometry of the helix or the bent-up helix and the tool required for this, the mold parting line and thus also the burrs usually also run along the flat sides of the helix in some areas. This may be the case in particular with permanent molds that have exactly two mold halves. The mold parting line then runs along the flat sides from the inner side to the outer side.

For at least one of the areas where the mold parting line runs along the flat sides, the permanent mold may have a protrusion extending along the mold parting line that projects into the cavity to provide a corresponding indentation in the casting on the corresponding flat side. A burr created there then lies in the indentation. If the casting is in the form of the helix, this burr, which is on the flat side in the indentation, cannot touch adjacent flat sides and is therefore harmless.

In an exemplary embodiment, an indentation is provided in the helix for each region where the mold parting line runs along one of the flat sides. In another embodiment, an indentation in the helix is provided on only a first of the flat sides for each area where the mold parting line runs along these flat sides. Burrs running on the opposite second flat side may be positioned in a plane with the burrs or indentations of the first flat side such that they are positioned in the indentations of the first flat side when the helix is compressed.

If indentations are provided on the first of the flat sides of the helix, it is also possible to provide protrusions extending along the mold parting line on the second of the flat sides instead of further indentations. These protrusions come to lie within the indentations when the casting is in the form of the helix and is compressed, but preferably in such a way that the burrs lying in the indentations and the burrs lying on the protrusions do not touch the other flat side since the indentation is correspondingly larger than the protrusion. This may at least partially compensate for any loss of cross-section caused by the indentations.

The permanent mold for the helix, which is suitable for carrying out the method presented, comprises two mold halves which may be joined together along a mold parting line, wherein the mold halves of the permanent mold have, in the joined state, a cavity which predetermines the form of the helix or the bent-up helix for the casting. The helix or bent-up helix has the flattened winding cross-section profile, wherein the winding cross-section profile has the two opposite flat sides, the outer side and the inner side opposite the outer side. The flat sides face each other when the casting is in the form of a helix or is brought into the form of a helix.

The mold parting plane runs at least in sections along the outer side and/or along the inner side and/or along edges of the winding cross-section profile.

Accordingly, there may be burrs on the casting after removal from the mold, which burrs extend in the mold parting line described. Before possible further processing, the removed casting represents a typical intermediate product, which is characterized by the described position of the burrs.

In the permanent mold, the mold parting line may run within each winding of the helix or bent-up helix defined by the cavity along the flat sides from the inner side to the outer side. It may be, for example, that the mold parting line runs twice along the inner side and twice along the outer side per winding. The permanent mold may have a protrusion extending into and tapering the cavity along the mold parting lines in at least one of the areas where the mold parting line runs along the flat sides. The protrusion is used to produce the indentation on the flat side.

If a protrusion is provided on the flat side, the permanent mold comprises a recess complementary to the protrusion, by which recess the cavity is enlarged in areas, and which recess runs along the mold parting line. The casting material entering this recess may then form the protrusion.

The helix may have a total of more than two windings, for example.

The cast helix, i.e. the helix which may be produced by the described method or by means of the described permanent mold, has the flattened winding cross-section profile. The winding cross-section profile has the two opposite flat sides, an outer side and an inner side opposite the outer side. The flat sides face each other.

Typically, the helix has no burrs on the inner side and outer side, as these were removed in the method. Burrs usually only appear on the flat sides and run between the inner side and the outer side. Their course may be selected so that the length of each burr overlapping the flat side in this way is as short as possible, for example at most 50 percent longer than a width of the flat side in each case.

It may be provided that indentations running from the outer side to the inner side on at least a first of the two flat sides or on both flat sides are provided. The burrs may run in these indentations.

It may also be that indentations are provided on the first of the flat sides and protrusions are provided on the second flat side, running from the outer side to the inner side and projecting into the indentations.

It must be emphasized that features that were only described in connection with the method may also be claimed for the permanent mold and/or the casting and vice versa.

Similarly, the features described in connection with the permanent mold may also be claimed for the casting and vice versa.

BRIEF DESCRIPTION OF THE DRAWINGS

The invention will be described in more detail hereafter by way of example based on the drawings.

In the drawings:

FIG. 4 further shows the casting within the cavity of the permanent mold;

DETAILED DESCRIPTION OF THE DRAWINGS

Figure 1A:
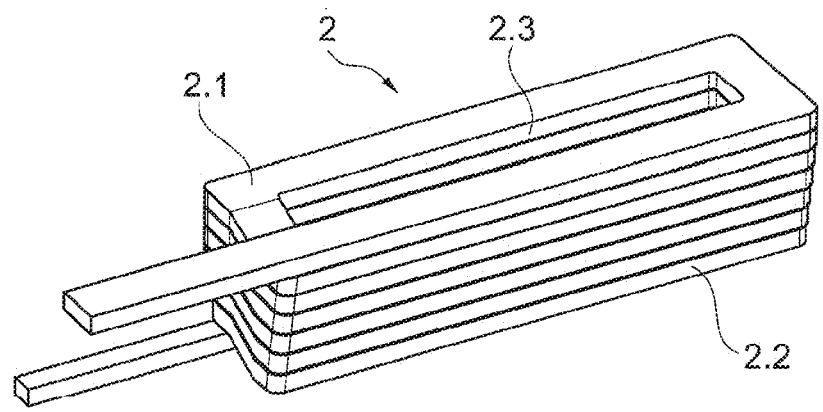
FIGS. 1A, 1B and 1C show a casting in the form of a helix.
Figure 1B:
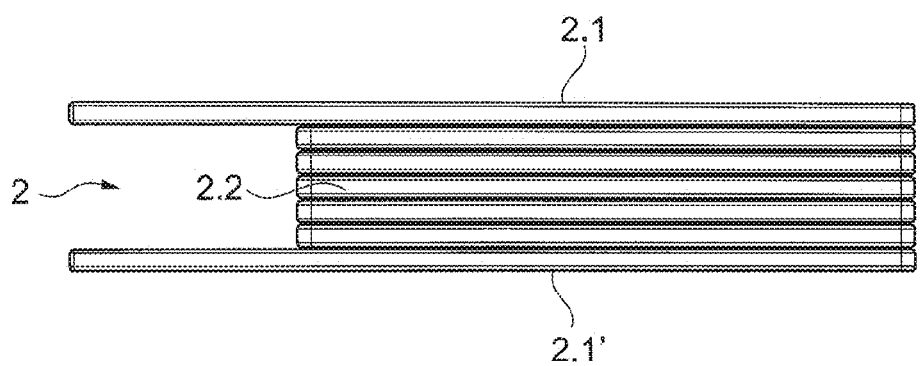
Figure 1C:
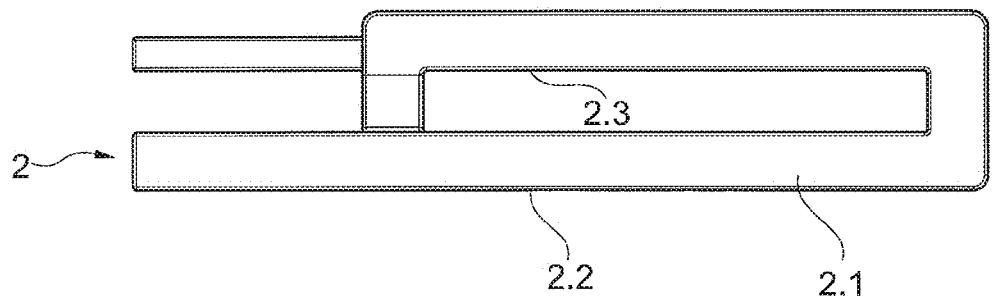
Figure 1D:
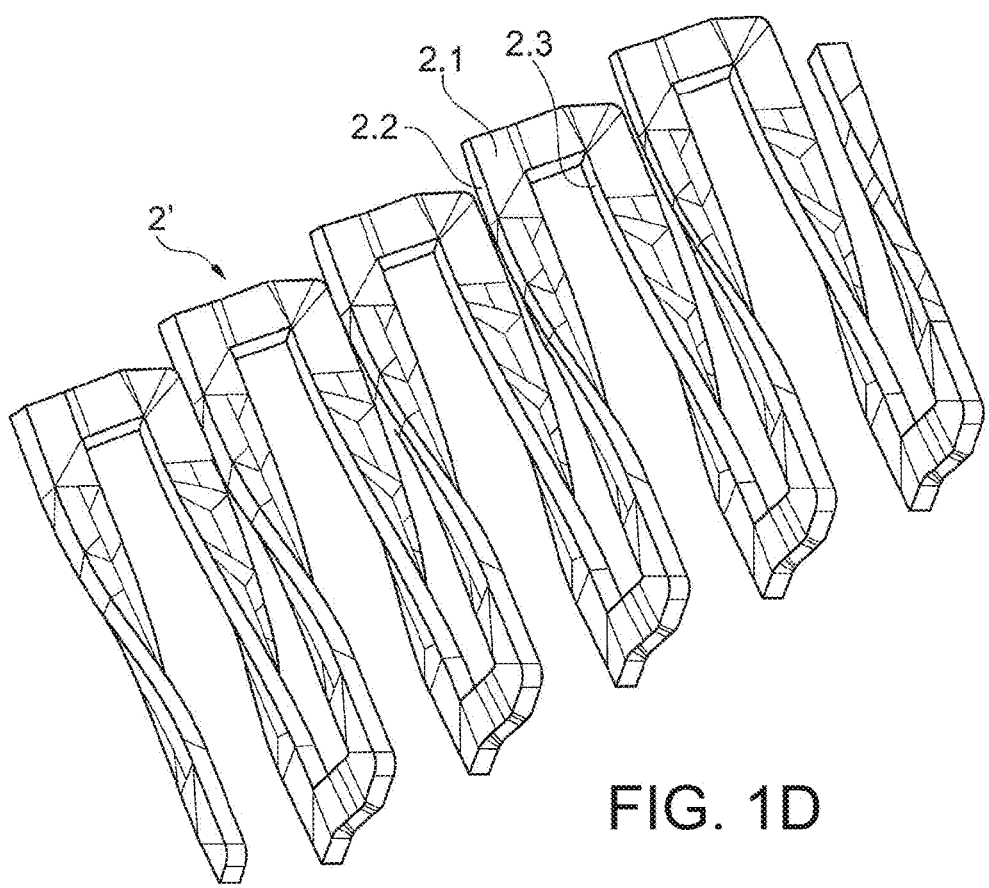
FIG. 1D shows the casting in the form of a bent-up helix.

FIGS. 1A-1D show a casting which is in the form of a helix 2 in FIGS. 1A-1C and in the form of a bent-up helix 2' in FIG. 1D. From the form shown in FIG. 1D, the casting may be bent over into the form of the helix 2 (as shown in FIG. 1A-1C).

FIG. 1A shows an oblique view of the casting as a helix 2, FIG. 1B shows a side view, and FIG. 1C shows a plan view. The helix has a flattened winding cross-section profile. In the present case, the winding cross-section profile is rectangular and has two opposite flat sides 2.1, 2.1', an outer side 2.2, and an inner side 2.3 opposite the outer side 2.2. An inner cavity of the helix 2, which is surrounded by the windings and delimited by the inner side 2.3, is also rectangular.

The outer dimensions of the helix, running around the outer side 2.2, are also rectangular or cuboid.

For the helix, adjacent windings may be defined such that each winding describes a complete revolution around the inner cavity of 360 degrees. Seven windings are shown.

The winding cross-section as well as the embodiment of the cavity cannot be achieved by winding.

External dimensions of the helix in each direction may be, for example, between 2 cm and 20 cm.

This application relates firstly to the type of casting shown here as a helix or bent-up helix.

The helix may advantageously be produced by methods to which this application also relates. Furthermore, the helix may be advantageously produced with the aid of permanent molds, to which this application also relates. The helix, method and permanent mold are described in further detail below with reference to the remaining figures.

Figure 2A:
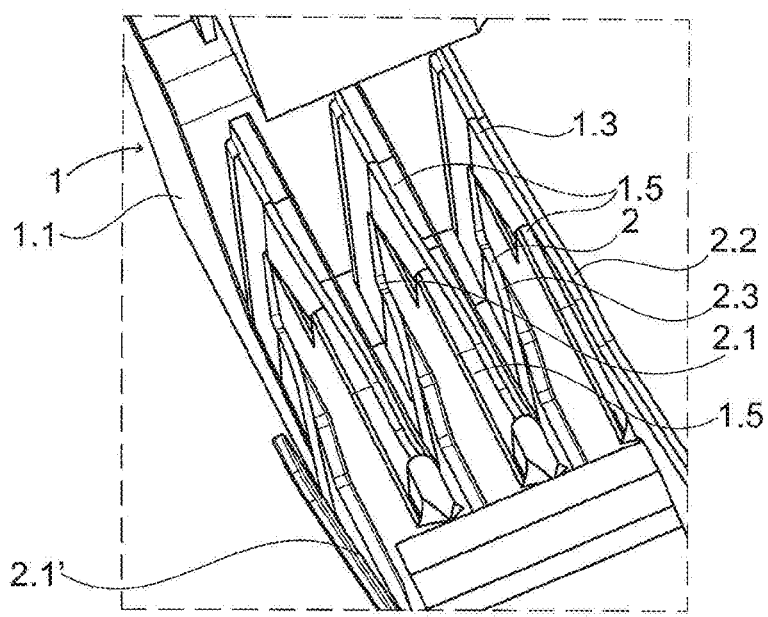
FIGS. 2A, 2B, and 2C show the casting within a cavity of a permanent mold.
Figure 2B:
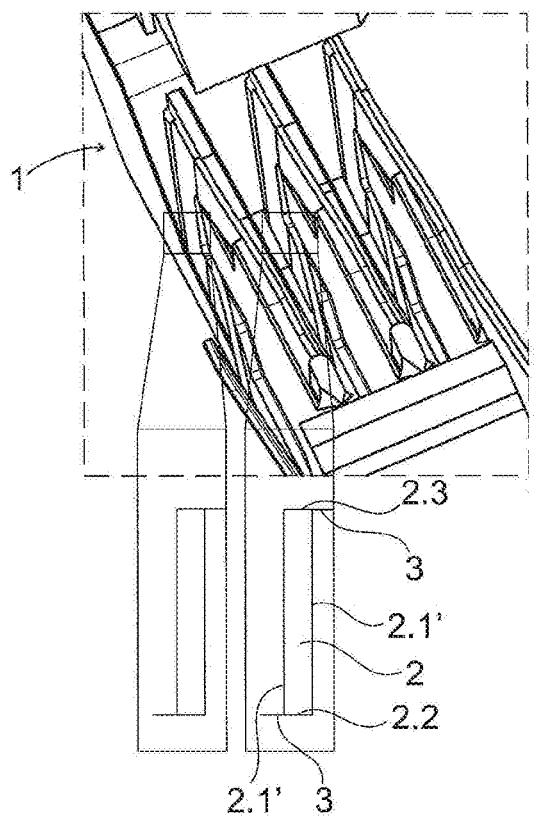
Figure 2C:
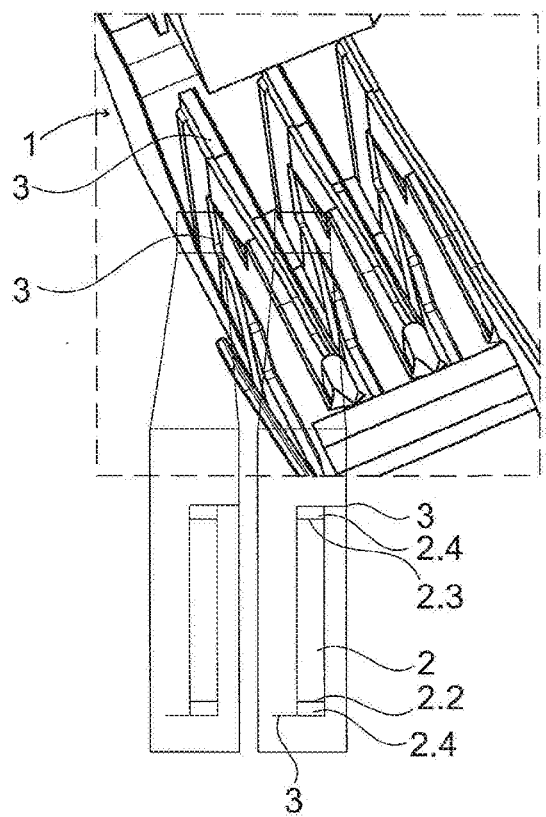

FIGS. 2A-2C shows the casting during a step of the method for its production, within a cavity 1.3 of a permanent mold 1. Only one mold half 1.1 of the permanent mold 1 is shown. A second mold half 1.2 of the permanent mold 1 is constructed in a manner complementary to the first mold half 1.1 and has been omitted for better illustration in FIGS. 2A-2C. The second mold half is designed in such a way that the first mold half 1.1 and the second mold half 1.2 may be joined in a mold parting line 1.5 and the cavity 1.3 extends between the two mold halves. The course of the cavity 1.3 can be seen in the figure by the shown casting, which has the form of the helix 2 and fills the cavity 1.3. The features of the helix 2 may be transferred accordingly to the cavity 1.3 and vice versa. In other words, the cavity is also rectangular in shape and has the opposing flat sides 2.1, 2.1', the outer side 2.2, and the inner side 2.3 opposite the outer side 2.2.

Furthermore, this figure thus also shows the shape of the second mold half 1.2.

The helix 2 is only slightly pulled apart but not bent up and otherwise has the features shown in FIGS. 1A-1C.

As can be seen in these figures, the mold parting line 1.5 runs at least in sections along the outer side 2.2, along the inner side 2.3, as well as along edges of the winding cross-section profile. In particular, it extends in areas parallel to the inner side 2.3 and the outer side 2.2. It passes over each of the two flat sides 2.1, 2.1' twice within each winding.

To produce the casting, a casting material is poured into the cavity 1.3 of the permanent mold 1. The permanent mold 1 has a corresponding opening for this purpose. Die casting, permanent mold casting or low-pressure die casting methods may be used. The casting material comprises aluminum and/or copper. A casting temperature is above 1100 degrees Celsius.

It is possible for casting material outside the cavity 1.3 to enter the mold parting line 1.5 between the two mold halves 1.1, 1.2. This may cause burrs 3. The position of the burrs 3 may thus be deduced from the course of the mold parting line 1.5. Possible burrs 3 thus extend in the casting removed from the permanent mold shown in FIG. 2C, starting from the outer side 2.2 or the inner side 2.3 parallel to the outer side 2.2 or inner side 2.3, respectively, and in regions in which the mold parting line 1.5 runs along the flat sides 2.1, 2.1', along the corresponding flat side 2.1, 2.1' and orthogonally thereto.

FIGS. 2B and 2C each show the view from FIG. 2A again, with two areas marked in each case, for which sections through the helix 2 are shown enlarged below the respective views. The position and orientation of the possible burrs 3 are illustrated in the sections. As shown in connection with FIG. 2A, they extend from inner and outer edges on the outer side 2.2 and the inner side 2.3 due to the course of the parting line 1.5. They run parallel to the outer side 2.2 and the inner side 2.3, in each case only in the direction of one of the flat sides 2.1, 2.1'.

The burrs are removed in a method step after the casting has been removed from the permanent mold 1. Due to their location, removal is easy.

In FIG. 2C, it is also shown that the cavity 1.3 has additional indentations extending along the entire outer side 2.2 and the entire inner side 2.1, including the respective edges. The indentations are used to produce sacrificial structures 2.4, of the helical casting. They run in the mold parting line 1.5 in such a way that the burrs 3 run at least in some areas along the sacrificial structures 2.4. The sacrificial structures are removed in a finishing step after the casting has been removed, together with the burrs 3 that run along them.

Figure 3:
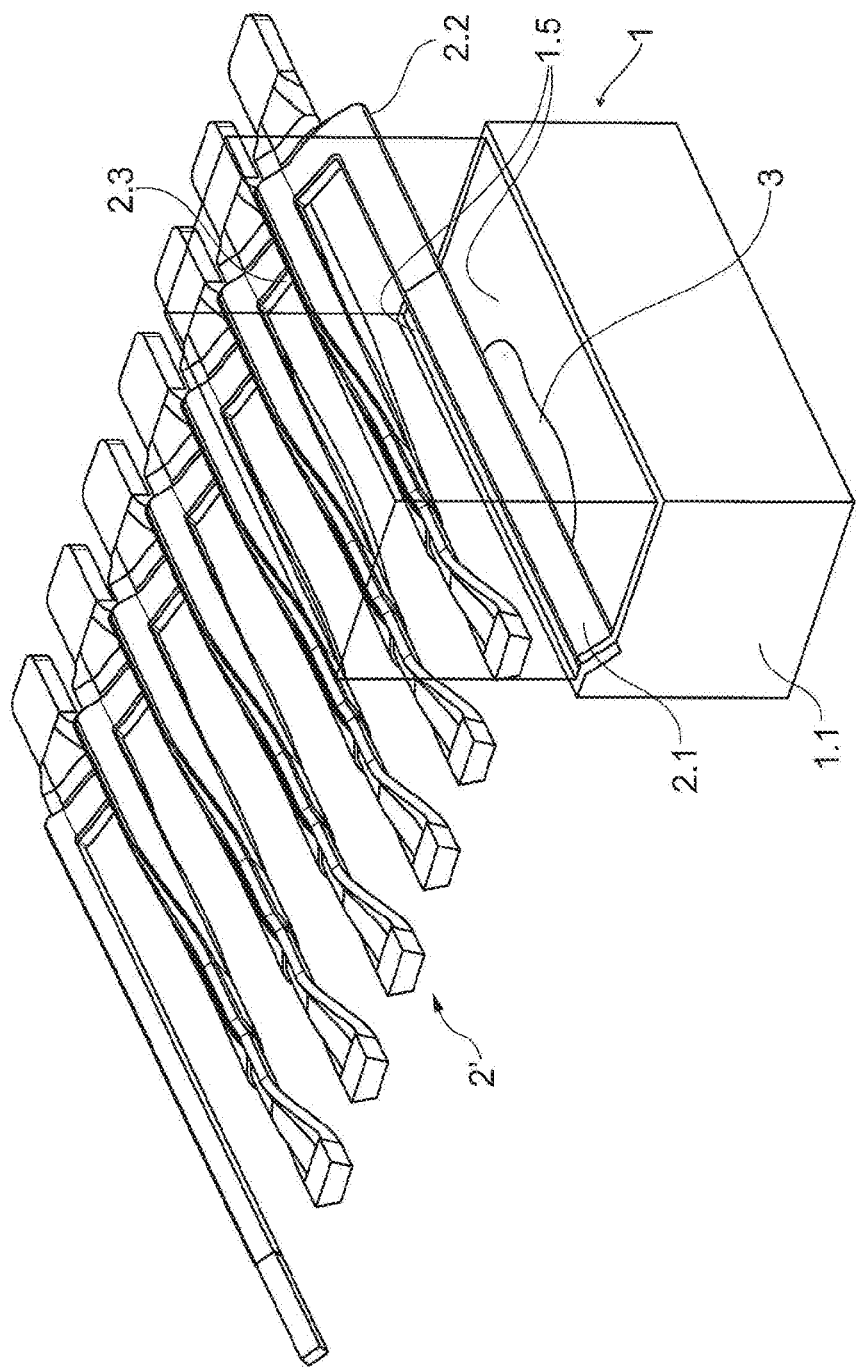
FIG. 3 also shows the casting within the cavity of the permanent mold.

FIGS. 3 and 4 show permanent molds 1 with cavities 1.3 designed so that the casting produced therein has the form of the bent-up helix 2', which is bent into the form of the helix 2 after removal. Again, in each case, only the first mold half 1.1 is shown and the second mold half 1.2 is omitted for reasons of visibility. The bent-up helix 2' may be produced here with only two mold halves and without the use of cores or slides.

To produce the casting, a casting material is poured into the cavity 1.3 of the permanent mold 1. The permanent mold 1 has a corresponding opening for this purpose. Die casting, permanent mold casting or low-pressure die casting methods may be used. The casting material comprises aluminum and/or copper. A casting temperature is above 1100 degrees Celsius.

The mold parting line 1.5, a part of which is shown in an exemplary manner in FIGS. 3 and 4, has in the case of FIG. 3 an angle α of approximately 45 degrees to both the outer side 2.2 and the inner side 2.3 of the bent-up helix 2'. Accordingly, possible burrs 3, one of which is shown by way of example, extend away from the outer side 2.2 or the inner side 2.3, respectively, at this angle α. This is in contrast to the embodiment shown in FIG. 2C, where the burrs 3 run parallel to the outer side 2.2 or inner side 2.3, respectively. This has the effect that the burrs 3 may be removed even more easily. In FIG. 4, the mold parting line 1.5 is such that the angle α of the burrs 3 to the inner side 2.3 is approximately 45 degrees and to the outer side 90 degrees.

Figure 5A:
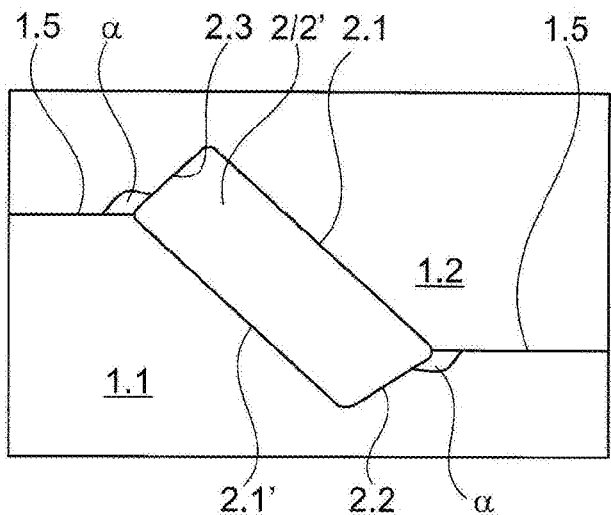
FIGS. 5A, 5B, and 5C show cross-sectional views of the casting within the cavity of the permanent mold.
Figure 5B:
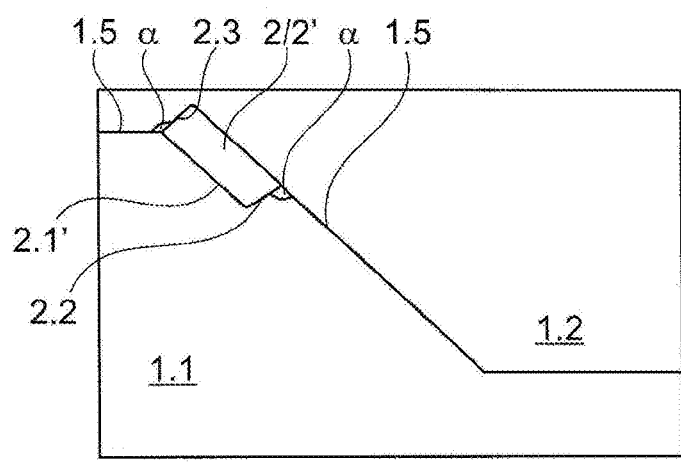
Figure 5C:
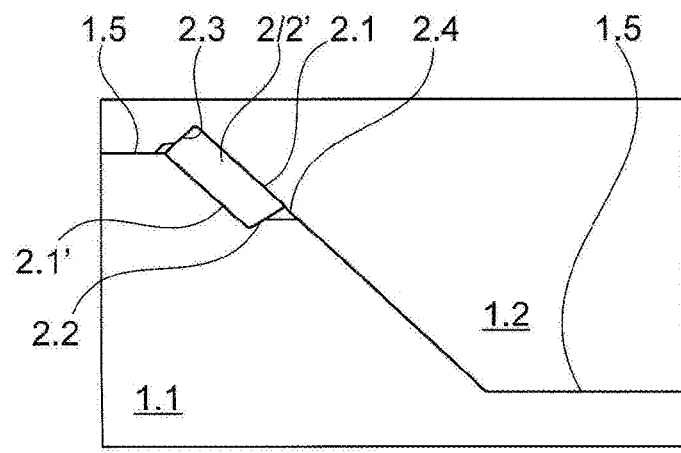

FIGS. 5A-5C show sections through the two mold halves 1.1, 1.2 of the permanent mold 1 and the casting lying in the cavity 1.3 formed between them, illustrating in particular the mold parting line 1.5 and its position in relation to the casting. This may be the casting in the form of the helix 2 or in the form of the bent-up helix 2'.

In the area of the section shown in FIG. 5A (it may be, for example, a section through the configuration of FIG. 3), the angle α between the outer side 2.2 and the mold parting line 1.5 is approximately 45 degrees. The mold parting line 1.5 extends here from an edge located on the outer side 2.2. The angle α between the inner side 2.2 and the mold parting line 1.5 is also approx. 45 degrees and the mold parting line 1.5 extends here from an edge lying on the inner side 2.2.

In the area of the section shown in FIG. 5B (it may be, for example, a section through the configuration of FIG. 4), the mold parting line 1.5 again extends starting from edges located on the inner side 2.3 or outer side of the casting or cavity 1.3. The angle α between the inner side 2.3 and the mold parting line 1.5 is approx. 45 degrees. The angle α between the outer side 2.2 and the mold parting line 1.5 is approx. 90 degrees.

FIG. 5C shows a variation of the illustration in FIG. 5B. In this case, the mold parting line 1.5 does not extend directly from the edge of the casting on the outer side, but adjoins a sacrificial structure 2.4, which is provided as additional casting material arranged on the outer side 2.2 and may then be removed together with a possible burr 3.

Therefore, in all configurations from FIGS. 5A to 5C, the mold parting line 1.5 encloses an angle of more than 0 degrees and less than 180 degrees with the outer side 2.2 and/or the inner side 2.3, and is therefore not parallel to either side.

Figure 6A:
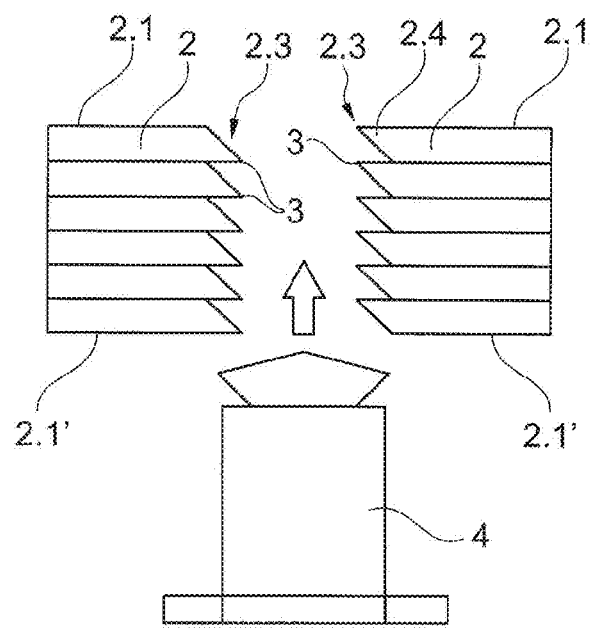
FIGS. 6A and 6B show a finishing of the casting after removal from the permanent mold.
Figure 6B:
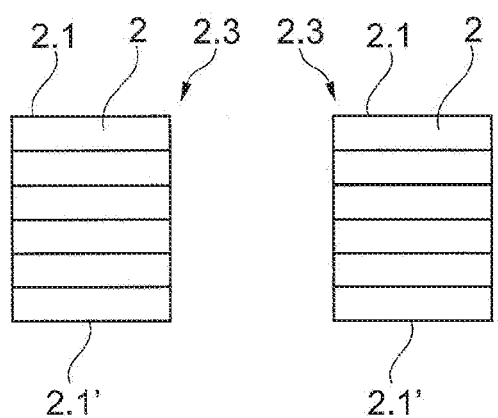

FIGS. 6A and 6B show how, in a method according to this application, burrs 3 located on the inner side 2.3 of the casting are removed. The burrs extend into the inner cavity of the casting when it is in the form of the helix 2. To remove the burrs, a mandrel 4 is inserted into the inner cavity, which has the dimensions of the inner cavity. Any excess material extending from the casting into the inner cavity is thereby bent over or removed. This excess material comprises in particular the burrs 3. Furthermore, as shown here, it may comprise sacrificial structures 2.4 positioned on the inner side 2.3 of the helix 2. The mandrel 4 may be inserted into the inner cavity even if the casting is initially, after removal from the permanent mold 1, in the shape of the helix 2, but slightly pulled apart. Similarly, the mandrel 4 may be inserted into the inner cavity if the casting is initially in the form of the bent-up helix 2 after removal from the permanent mold 1. The mandrel 4 has a flat part at one end which engages the flat side 2.1' and may bend the casting, with simultaneous counterpressure from the other flat side 2.1, into the form of the helix.

Figure 7A:
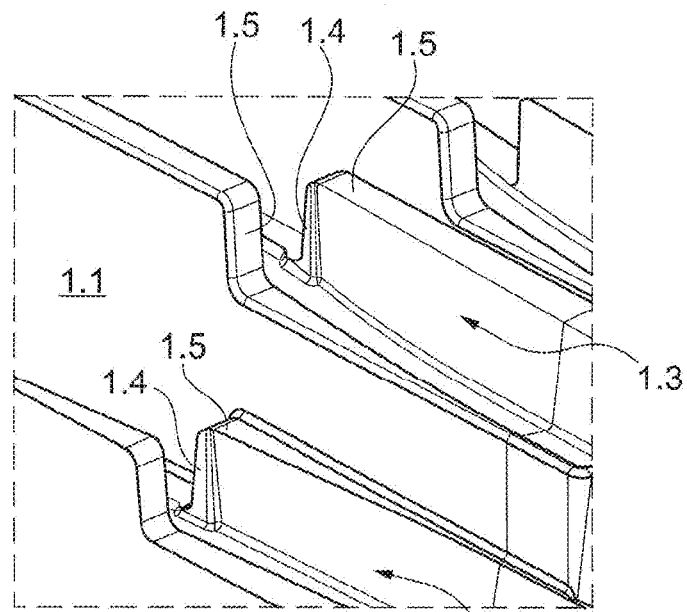
FIGS. 7A and 7B show one mold half of the permanent mold with additional protrusions.
Figure 7B:
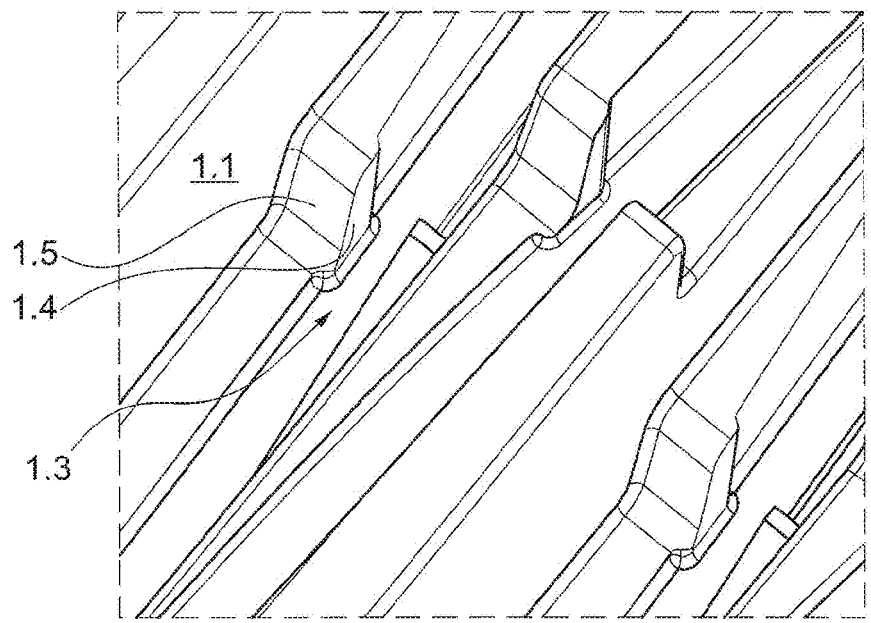

FIGS. 7A and 7B show the first mold half 1.1 of the permanent mold 1 with the cavity 1.3. FIG. 7A shows an oblique view from the side and FIG. 7B shows an oblique view from above. Here, the permanent mold 1 has a protrusion 1.4 extending along the mold parting lines 1.5 in some of the areas where the mold parting line 1.5 runs along one of the flat sides 2.1, 2.1'. The casting produced with this permanent mold 1 thus has corresponding indentations 2.5 on the flat sides 2.1, 2.1', which are complementary to the protrusions 1.4 and run from the inner side 2.3 to the outer side 2.2. Since the mold parting line 1.5 runs along this protrusion 1.4, the burrs 3 may be laid in the indentations 2.5 with this permanent mold.

The described embodiment is also possible for tools that otherwise have the features from FIGS. 2A-5C.

Figure 8:
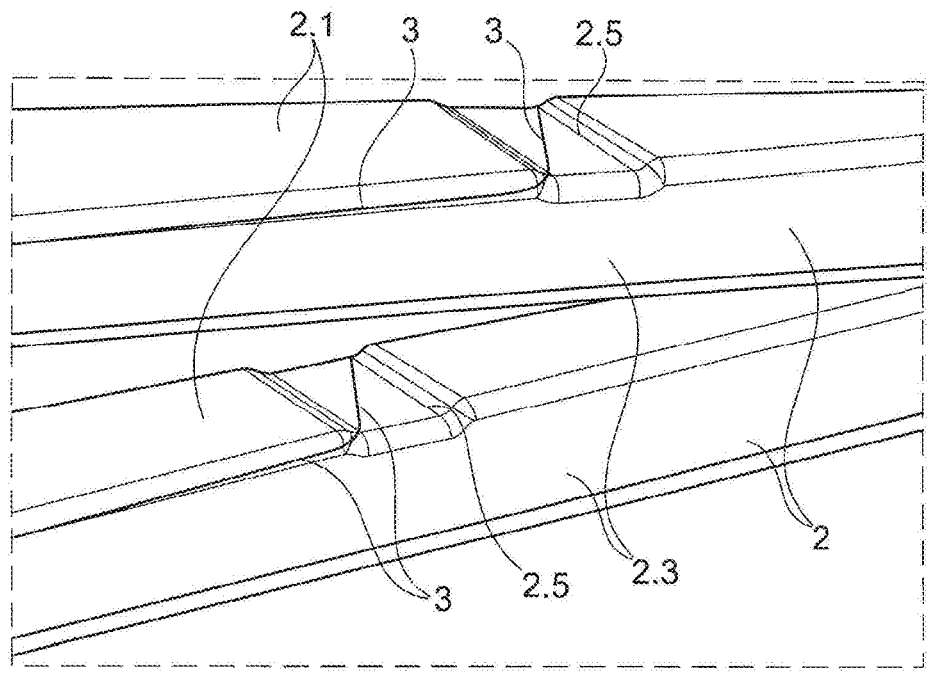
FIG. 8 shows the casting with indentations on flat sides.
Figure 9:
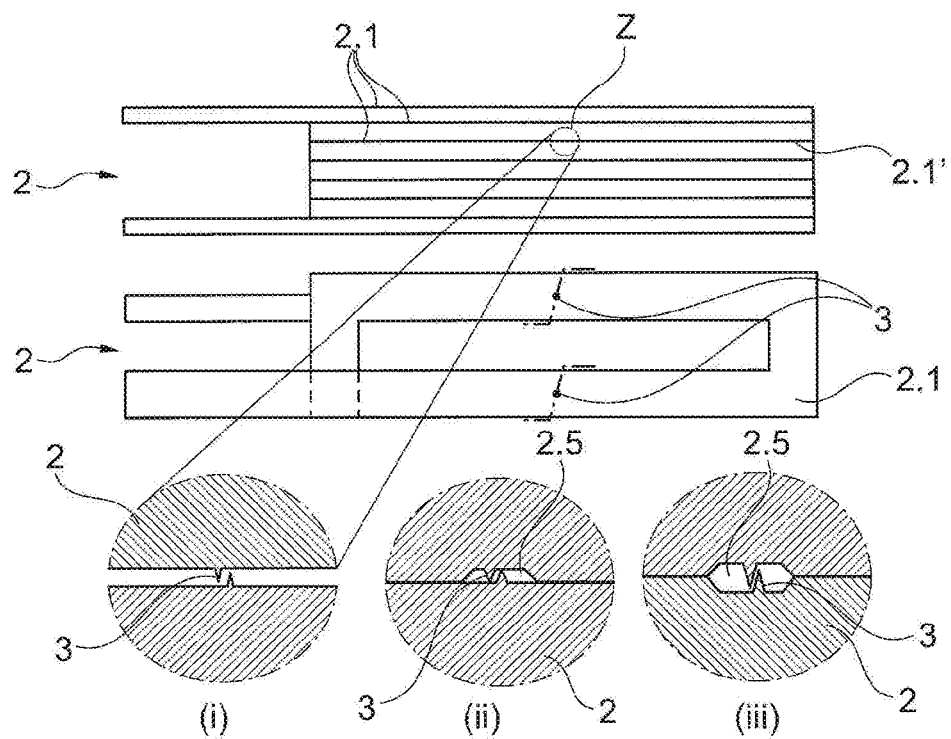
FIG. 9 also shows the casting with the indentations on flat sides.

To produce the casting, a casting material is poured into the cavity 1.3 of the permanent mold 1. The permanent mold 1 has a corresponding opening for this purpose. Die casting, permanent mold casting or low-pressure die casting methods may be used. The casting material comprises aluminum and/or copper. A casting temperature is above 1100 degrees Celsius. FIGS. 8 and 9 illustrate castings produced, for example, with the permanent mold 1 of FIGS. 7A and 7B. They have the indentations 2.5 on one or both of the flat sides 2.1, 2.1'.

FIG. 8 shows sections of windings of the casting in which indentations are arranged on the first flat side 2.1. The indentations 2.5 run orthogonally to the edges of the casting, connecting the outer side 2.2 and the inner side 2.3. The position of possible burrs 3 is indicated in FIG. 8. According to the embodiment of the permanent mold 1 shown in FIGS. 7A and 7B, they run diagonally through the indentations 2.5 and are thus harmless, since they do not touch the second flat side 2.1' even when the casting is compressed as a helix 2. In the area of the edges, when the mold parting line 1.5 and thus the burrs 3 come into the area of the outer side 2.2 or inner side 2.3, the mold parting line 1.5 and thus the burr 3 are guided along the edge and may be removed in a finishing step, together with any sacrificial structures 2.4 present there. In FIG. 8, no indentation 2.5 is provided on the second flat side 2.1', since burrs 3 running there are predetermined by the mold parting line 1.5 in such a way that they project into the recesses 2.5 of the first flat side 2.1 when the helix 2 is compressed and are thus also harmless.

FIG. 9 illustrates further possible embodiments in which burrs 3 lying on flat sides are rendered harmless by indentations 2.5.

At the top of the figure, the helix 2 is shown in the side view from FIG. 1B. In this side view, an area Z is marked, which is shown enlarged at the bottom in FIG. 9 for three embodiments (i), (ii), (iii) of the helix.

The center of FIG. 9 shows the plan view from FIG. 1C, in which the course of the mold parting line 1.5 and thus the course of the burrs 3 over the flat sides 2.1, 2.1', from the outer side 2.2 to the inner side 2.3, is shown. It is precisely this burr 3 that is now shown enlarged below in the figure for the three embodiments (i), (ii), (iii).

Embodiment (i) is an embodiment in which there is no indentation 2.5 at all. In such embodiments, the burrs 3 may have to be removed in a finishing step on the outer side 2.2 and/or inner side 2.3 and/or the flat sides 2.1, 2.1'.

Embodiment (ii) shows an indentation 2.5 on only one flat side 2.1'. The burr 3 runs on both flat sides 2.1, 2.1' within this indentation 2.5, wherein the burr 3 on one flat side 2.1 is offset with respect to the other flat side 2.1' in such a way that the burrs 3 of the flat sides 2.1, 2.1' facing one another do not touch even when the helix 2 is completely compressed as shown here.

Embodiment (iii) is an embodiment in which indentations 2.5 are present on both flat sides 2.1, 2.1'. The burrs 3 are offset from each other as in (ii) and cannot touch. In this embodiment, even larger burrs 3 may be tolerated than in (ii).

FIGS. 10A and 10B again show the helix 2, in which burrs 3 running along flat sides are to be rendered harmless. The view is selected as in FIG. 9 at the bottom.

Figure 10A:
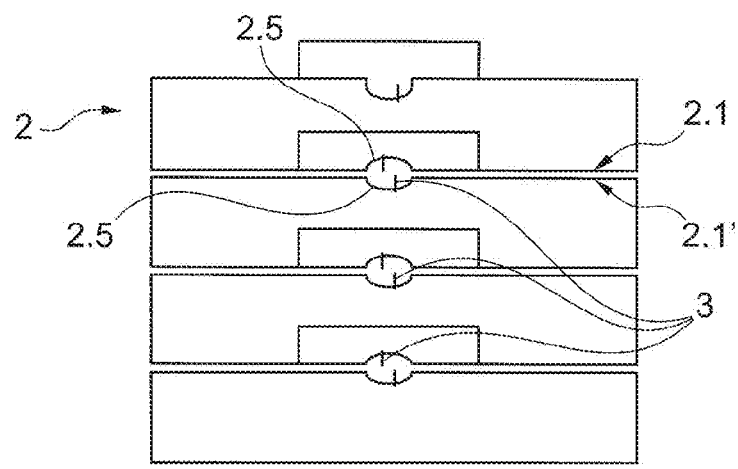
FIGS. 10A and 10B further show the casting with the indentations on flat sides.

Similarly to embodiment (iii), FIG. 10A has indentations 2.5 on both flat sides 2.1, 2.1'. The corresponding permanent mold thus has protrusions 1.4 complementary to the indentations 2.5 on both flat sides 2.1, 2.1'.

Figure 10B:
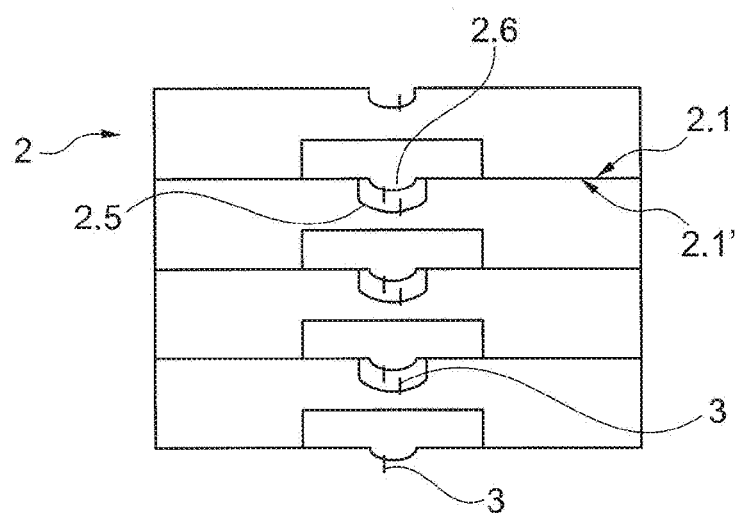

In contrast, the embodiment shown in FIG. 10B has indentations 2.5 on the flat side 2.1', but protrusions 2.6 on the other flat side 2.1. These protrusions 2.6 of the helix 2 are positioned similarly to the indentations 2.5, i.e. they run along the mold parting line 1.5. Burrs 3 therefore also extend along the protrusions 2.6. When the helix 2 is compressed as shown in FIG. 10B, the protrusions 2.6 and the burrs 3 located thereon are pressed into the indentations 2.5. The dimensions of the protrusions 2.6 are smaller here than the dimensions of the indentations 2.5, so that the protrusions 2.6 and the burrs 3 may be accommodated in the indentations 2.5. The additional material provided in the form of protrusions 2.6 on the flat side 2.1 may at least partially compensate for a loss of cross section. For the production of such a casting as shown in FIG. 10B, the permanent mold 1 has recesses on one of the flat sides 2.1, 2.1' which extend in the mold parting line 1.5 and define the protrusions 2.6.

On the other of the two flat sides 2.1, 2.1', on the other hand, it has the protrusions 1.4 that define the indentations 2.5.

LIST OF REFERENCE NUMERALS

1 permanent mold
1.1 first mold half
1.2 second mold half
1.3 cavity
1.4 protrusion of the permanent mold
1.5 mold parting line
2 helix
2' bent-up helix
2.1, 2.1' flat side
2.2 outer side
2.3 inner side
2.4 sacrificial structure
2.5 indentation
2.6 protrusion
3 burr
4 mandrel

What is claimed is:

1. A method for producing a helix, the method comprising:
providing a permanent mold which has exactly two mold halves, and no more than two mold halves, that are joinable together in a mold parting plane;
joining together the exactly two mold halves of the permanent mold so that the permanent mold, when joined, has a cavity that defines a form of the helix or a form of a bent-up helix, the helix or bent-up helix having a total of more than two windings, the form of the helix or bent-up helix being defined by the no more than two mold halves, wherein no additional sliders of cores are used, wherein the helix or the bent-up helix defines a flattened winding cross-section profile with two opposite flat sides, an outer side and an inner side opposite the outer side, and wherein the mold parting plane runs at least in sections along at least one of the outer side and the inner side and along edges of the winding cross-section profile;
introducing a casting material into the cavity to produce a casting having the form of the helix defined by the cavity or the form of the bent-up helix;
opening the permanent mold and removing the casting;
removing burrs running along at least one of the outer side and the inner side and edges of the casting in the mold parting plane;
wherein the flat sides of the casting face each other when the casting is one of in the form of the helix and is brought into the form of the helix.

2. The method according to claim 1, wherein the casting is bent into the form of the helix after removal.

3. The method according to claim 1, wherein the mold parting plane, in sections in which it runs along at least one of the outer side and the inner side and the edges of the winding cross-section profile, encloses an angle of more than 0 degrees and less than 180 degrees with at least one of the outer side and the inner side.

4. The method according to claim 1, wherein the cavity, in at least part of areas where the mold parting plane runs along at least one of the outer side and the inner side and the edges of the winding cross-section profile, comprise additional indentations to produce sacrificial structures which extend along at least one of the outer side and the inner side and the edges of the casting in the mold parting plane, wherein the sacrificial structures are removed in a reworking step after the casting has been removed from the permanent mold, together with the burrs that run along them.

5. The method according to claim 1, further comprising inserting a mandrel into the bent-up helix to at least one of remove the burrs on the inner side and bend together the bent-up helix to form the helix.

6. The method according to claim 1, wherein the casting material comprises at least one of aluminum and copper.

7. The method according to claim 1, wherein the casting temperature is above 1100 degrees Celsius.

8. The method according to claim 1, wherein one of a die casting method or a permanent mold casting method or a low-pressure die casting method is used.

9. The method according to claim 1, wherein the mold parting plane runs within each winding of the helix or bent-up helix defined by the cavity along the flat sides from the inner side to the outer side, and wherein the permanent mold, at least in one area where the mold parting plane runs along the flat sides, comprises a protrusion extending along the mold parting plane that projects into the cavity so that the casting contains corresponding indentations on the flat sides.

10. The method according to claim 9, wherein the permanent mold, in each area where the mold parting plane runs along a first of the flat sides, comprises protrusions extending along the mold parting plane, such that the casting is provided on the first of the flat sides with corresponding indentations running in the mold parting plane.

11. The method according to claim 10, wherein the permanent mold, in each area where the mold parting plane runs along a second of the flat sides, comprises one of:
the protrusions extending along the mold parting planes, such that the casting is provided with the indentations on both flat sides in the mold parting plane,
recesses extending along the mold parting plane, such that the casting is provided on the first of the flat sides in the mold parting plane with the indentations and on the second of the flat sides in the mold parting plane with protrusions, wherein the protrusions lie within the indentations when the casting is in the form of the helix.

* * * * *